United States Patent Office 3,677,925
Patented July 18, 1972

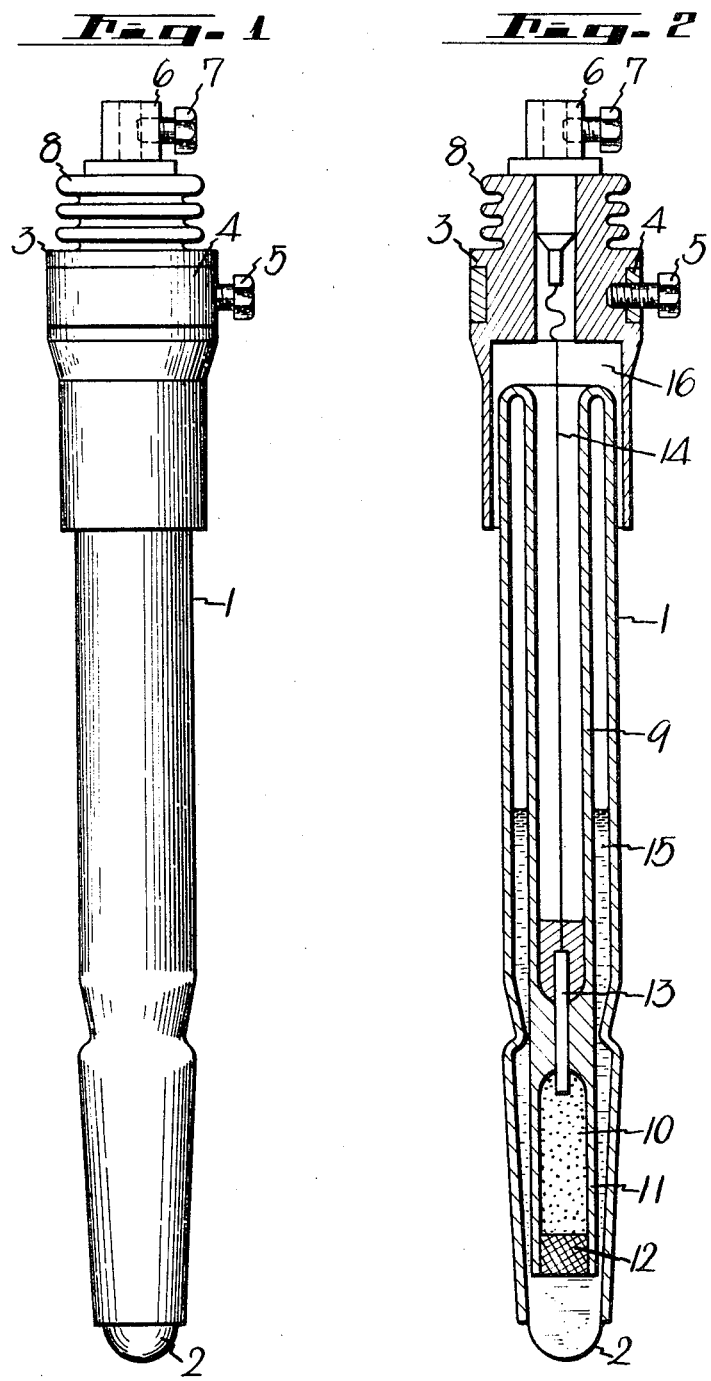

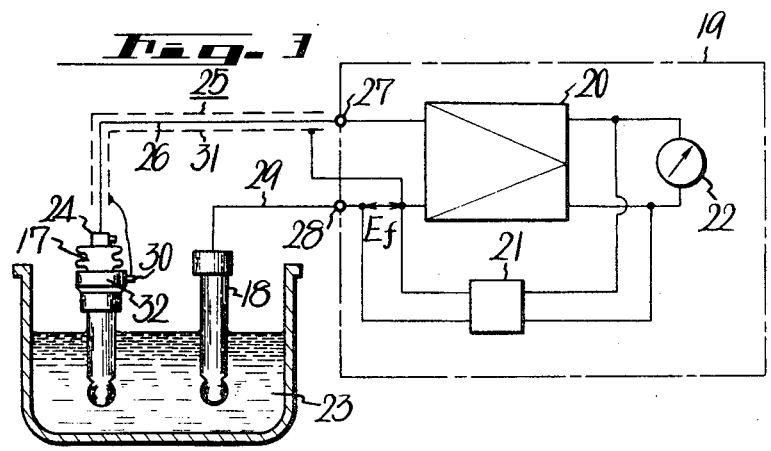
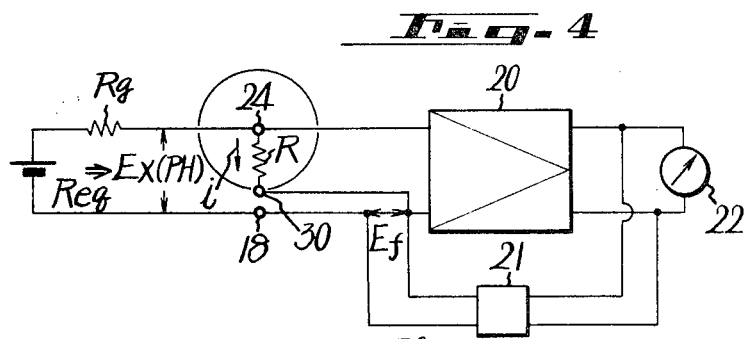
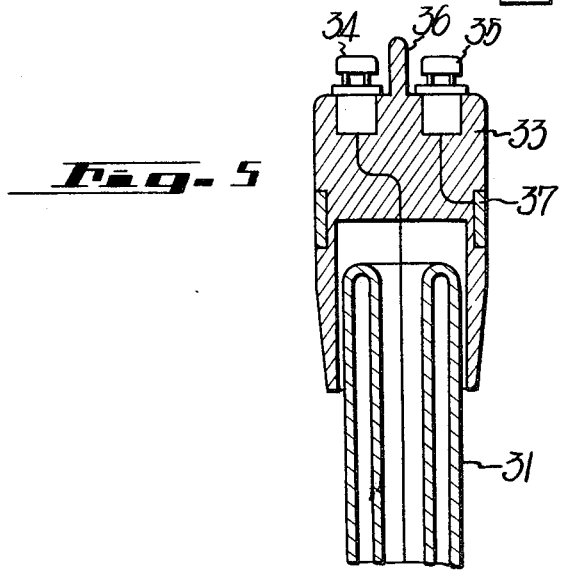

3,677,925
APPARATUS FOR MEASURING pH
Tokutaro Tamate, Eiichi Yagi, and Hisayuki Ikeda, Tokyo, Japan, assignors to Kabushikikaisha Yokogawa Denki Seisakusho, Tokyo, Japan
Filed July 22, 1970, Ser. No. 57,163
Int. Cl. G01n 27/36
U.S. Cl. 204—195 R
3 Claims

ABSTRACT OF THE DISCLOSURE

A glass electrode having support tube means, an inner electrode disposed therein, a cap formed of an insulating material and fixed on the top of the support tube means, a glass electrode terminal provided on the cap and connected with the inner electrode, a guard ring fixed on the periphery of the cap and a guard ring terminal, in which a negative feedback voltage from a negative feedback amplifier is impressed to the guard terminal, the negative feedback amplifier amplifying a signal derived at the glass electrode terminal.

BACKGROUND OF THE INVENTION

Field of the invention

This invention relates to a pH measuring instrument, and more particularly to a glass electrode for pH measuring instrument.

Description of the prior art

In order to simplify the construction and allow ease in handling of a glass electrode and a reference electrode, there has heretofore been employed the so-called leadless electrode system such that no leads are directly connected to the electrodes but instead terminals are provided on them for external connection leads. In the conventional leadless electrode, however, its insulation on the surface in the vicinities of the electrode terminals becomes reduced to cause an error in the measurement when used for a long time or in an atmosphere of high temperature and humidity. To avoid this, it has been proposed to cover the electrode terminals with rubber caps but this introduces complexity in construction and if the rubber caps come off or if the electrode terminals are left uncovered for a long time, there is the possibility of lowering the insulation of the electrode on the surface thereof to bring out the aforementioned undesirable result.

SUMMARY OF THE INVENTION

Accordingly, one object of this invention is to provide a glass electrode which is adapted to effectively compensate for the influence of lowering of the insulation in the vicinities of electrode terminals.

Another object of this invention is to provide a leadless glass electrode designed to minimize lowering of its insulation.

Still another object of this invention is to provide a leadless glass electrode which stably operates at high temperatures.

Other objects, features and advantages of this invention will become apparent from the following description taken in conjunction with the accompanying drawings.

BRIEF DESCRIPTION OF THE DRAWINGS

FIG. 1 is a front view of one example of glass electrodes of this invention;

FIG. 2 is a longitudinal cross-sectional view of the glass electrode exemplified in FIG. 1;

FIG. 3 is a diagrammatic showing of a pH meter employing the glass electrode of this invention;

FIG. 4 is an equivalent circuit diagram of an electric circuit of the pH meter shown in FIG. 3; and FIG. 5 is a cross-sectional view, partly cut away, illustrating another example of the glass electrode of this invention.

DESCRIPTION OF THE PREFERRED EMBODIMENTS

In FIG. 1 reference numeral 1 indicates a support tube formed of glass, 2 a glass membrane which generates electromotive force in response to pH, 3 a cap formed of an insulating material for covering the upper end portion of the support tube 1, 4 a guard ring mounted on the outer peripheral surface of the cap 3, 5 a guard terminal, 6 an electrode terminal mounted on the upper end of the cap 3, 7 a fixing screw provided on the electrode terminal 6 for fixing an external lead to the electrode terminal 6, and 8 an insulating member interposed between the guard ring 4 and the electrode terminal 6 and having several corrugations like bellows. The insulating member 8 is made by molding epoxy resin or the like and is water-repellent on its surface. Accordingly, the insulating member 8 is well insulated at its surface due to the water repellency and corrugations when used for a long period of time or in an atmosphere of high temperature and humidity.

FIG. 2 is a longitudinal cross-sectional view of the glass electrode of FIG. 1. In one figure reference numeral 9 indicates an internal electrode support tube and 10 an internal electrode in which silver chloride powder of little sensitivity for light is packed into an internal electrode support container 11 together with a saturated potassium chloride solution acting as a support solution. The silver chloride particle is of such a construction that a silver particle present therein like a nucleus or core is covered thick with silver chloride. Reference numeral 12 designates a porous plug using glass wool, which is inserted into the open end of the container 11 to seal therein the electrode 10. Reference 13 indicates a platinum wire for connecting the internal electrode 10 with one end of a lead wire 14 in the support tube 9 and the other end of the lead wire 14 is connected with the electrode terminal 6. Reference numeral 15 identifies an inner reference solution filled in the support tube 1 which inner reference solution 15 contains a potassium chloride solution and acts as a buffer solution and 16 and adhesive binder such, for example, as epoxy resin for tightly fixing cap 3 on the upper end of the support tube 1 and sealing therebetween.

In FIG. 3 there is illustrated one example of a pH meter employing the glass electrode of this invention above described. Reference numeral 17 indicates a glass electrode such as depicted in FIG. 2, 18 a reference electrode, and 19 a pH measuring unit consisting of, for example, an amplifier 20 of high input impedance, a feedback circuit 21 and an indicator 22. For practical pH measurement a resistance thermometer bulb for temperature compensation is used in addition to the above members but it is omitted for convenience of explanation.

The glass electrode 17 and the reference electrode 18 are both immersed in a test solution 23. An electrode terminal 24 of the glass electrode 17 is connected with one input terminal 27 of the pH measuring unit 19 through a conductor 26 of a lead wire 25, while the reference electrode 18 is connected with the other input terminal 28 of the pH measuring unit 19 through a lead wire 29. A guard terminal 30 of the glass electrode 17 is connected to a shield 31 in such a manner as to be supplied with a feedback voltage $Ef$ of the amplifier 20 through the shield 31 of the lead wire 25.

FIG. 4 is an electrically equivalent circuit of FIG. 3. In the figure reference character $Ex$ indicates a voltage generated in proportion to the pH value of the liquid 23, $Rg$ an input resistance of the glass electrode 17 and R a leakage resistance between the electrode terminal 24 and the guard terminal 30 of the glass electrode 17, which leakage resistance has a very great value, since the distance between the electrode terminal 24 and a guard ring 32 is lengthened by the provision of the several corrugations therebetween. In the equivalent circuit a leakage current $i$ flowing through the leakage resistor R is given by the following equation.

$$i = \frac{Ex - Ef}{R} \quad (1)$$

Accordingly, the apparent leakage resistance $Req$ viewed from the electrode is expressed as follows.

$$Req = \frac{Ex}{i}$$

$$= \frac{Ex}{Ex - Ef} R \quad (2)$$

As will be apparent from the Equation 2, the apparent leakage resistance $Req$ viewed from the electrode can be increased $$\frac{Ex}{Ex - Ef}$$

times as high as the actual leakage resistance R.

FIG. 5 is a fragmentary cross-sectional view showing a modified form of the glass electrode of this invention.

In the present example reference numeral 31 designates an inner electrode support tube made of glass, in which an electrode terminal 34 and a guard terminal 35 are disposed on the top of a cap 33 of the support tube 31 and a projection 36 of suitable height formed of an insulating material which is, for example, the same as the cap 33 is formed on the top of the cap 33 between the electrode terminal 34 and the guard terminal 35 to prolong the insulation distance therebetween on the surface. Reference numeral 37 designates a guard ring. Since the other elements are substantially the same as those in FIGS. 1 and 2, no detailed description will be repeated for the sake of brevity.

In the glass electrode of this invention a guard ring is fixed onto the periphery of a cap formed of an insulating material and fixed on the top of the glass electrode and a negative feedback voltage of an amplifier can be applied to the guard ring as above described, the apparent leakage resistance of the glass electrode is increased thereby to compensate for an error in measurement due to a decrease in insulation near the electrode terminal. Accordingly, the present invention provides a leadless glass electrode which is small in error in measurement resulting from the lowering of insulation when used for a long period of time or in an atmosphere of high temperature and humidity.

Further, the present invention employs a silver chloride electrode of low sensitivity for light as an inner electrode of the glass electrode, so that the glass electrode can be used stably at high temperatures for a long period of time.

It will be apparent that many modifications and variations may be effected without departing from the scope of the novel concepts of this invention.

We claim as our invention:

1. Means for measuring the pH of a solution comprising a reference electrode, a glass electrode comprising a support tube having one end closed by an ion sensitive glass membrane, an inner reference electrode disposed within said support tube, an insulating cap fixed to the top of said support tube, a glass electrode terminal located on said cap and connected to said inner electrode, a conductive guard ring at the periphery of said cap, and a guard terminal connected to said guard ring, and electrical circuit means connected to said reference electrode and said glass electrode for measuring the pH of a solution to which the electrodes may be exposed and for applying a negative feedback voltage to said guard terminal in response to voltage generated at said glass electrode terminal.

2. The combination of claim 1 in which said cap is provided with corrugations between said electrode terminal and said guard ring to increase the extent of the insulating surface therebetween.

3. The combination of claim 1 in which the inner electrode includes a container, and silver chloride coated silver particles located within said container.

References Cited

UNITED STATES PATENTS

| | | | |
|---|---|---|---|
| 3,476,672 | 11/1969 | Snyder et al. | 204—195 |
| 3,523,777 | 8/1970 | Petersen et al. | 204—195 X |
| 3,578,579 | 5/1971 | Hebert et al. | 204—195 |

GERALD L. KAPLAN, Primary Examiner

U.S. Cl. X.R.

204—195 G; 324—30 R